(12) United States Patent
Beeker et al.

(10) Patent No.: US 6,321,347 B1
(45) Date of Patent: Nov. 20, 2001

(54) NETWORK TESTING SYSTEM AND METHOD

(75) Inventors: Scott A. Beeker, Colorado Springs; Cornelius J. Falvey, Castle Rock; Mark P. Mullally, La Junta, all of CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/143,958

(22) Filed: Aug. 31, 1998

(51) Int. Cl.[7] ................................................. G06F 11/00
(52) U.S. Cl. ............................................... 714/28; 370/251
(58) Field of Search ................................. 714/28, 29, 30, 714/32, 33, 38, 39, 43, 46, 4, 25; 379/9, 111, 201, 10, 15; 370/247, 251, 242, 474; 709/227, 234

(56) References Cited

U.S. PATENT DOCUMENTS

| | | | |
|---|---|---|---|
| 5,289,474 | * | 2/1994 | Purcell et al. ...................... 371/20.5 |
| 5,544,154 | * | 8/1996 | Glitho ................................... 370/17 |
| 5,546,540 | * | 8/1996 | White ................................ 395/200.1 |
| 5,563,875 | * | 10/1996 | Hefel et al. ............................ 370/15 |
| 5,627,766 | * | 5/1997 | Beaven .............................. 364/551.01 |
| 5,721,728 | * | 2/1998 | Fowler et al. ........................ 370/250 |
| 5,737,517 | * | 4/1998 | Kite et al. ......................... 395/183.14 |
| 5,787,147 | * | 10/1998 | Gundersen ............................. 379/10 |
| 5,898,674 | * | 4/1999 | Mawhinney et al. ................. 370/247 |
| 5,931,913 | * | 8/1999 | Meriwether et al. ................. 709/227 |
| 5,931,961 | * | 8/1999 | Ranganathan et al. ............... 714/712 |
| 5,970,120 | * | 10/1999 | Kasrai ..................................... 379/9 |
| 6,002,864 | * | 12/1999 | Heyman ........................... 395/500.44 |
| 6,016,334 | * | 1/2000 | Kasrai ................................... 379/15 |

OTHER PUBLICATIONS

RT smart Sockets C++ Class Library Manual, Version 3.5, Talarian, 444 Castro Street, Suite 140, Mountain View, CA 94041.
RT smart Sockets Read Me First, Installation, Release Notes, Known Bugs, Demos, Version 3.5, Talarian, 444 Castro Street, Suite 140, Mountain View, CA 94041.
RT smart Sockets API Quick Reference, Version 3.5, Talarian, 444 Castro Street, Suite 140, Mountain View, CA 94041.
RT smart Sockets Manual, Reliable Interprocess Communication, Version 3.5, Talarian, 444 Castro Street, Suite 140, Mountain View, CA 94041.
RT smart Sockets API, Reliable Interprocess Communication, Version 3.5, Talarian, 444 Castro Street, Suite 140, Mountain View, CA 94041.
RT works Utilities Manual, License Manager, Utilities, Macros, RT works 3.5, Talarian, 444 Castro Street, Suite 140, Mountain View, CA 94041.

* cited by examiner

Primary Examiner—Nadeem Iqbal

(57) ABSTRACT

A network testing system (50) includes a message compiler (52) accepting a plurality of data inputs (54) to create a test message (56). A communicator (58) is capable of transmitting the test message (56) to a component under test (60). The test message (56) is compliant with any of a plurality of protocols. The communicator (58) is also capable of emulating a communication session using an emulation module.

36 Claims, 11 Drawing Sheets

NETWORK TESTING SYSTEM AND METHOD

RELATED APPLICATIONS

The present application is related to patent applications Ser. Nos. xxx (COS-96-033, COS-96-034 & COS-96-035) assigned to the same assignee as the present application and having the same inventors as the present application.

FIELD OF THE INVENTION

The present invention relates generally to the field of networks and more particularly to a network testing system and method.

BACKGROUND OF THE INVENTION

Computer systems running complex interrelated software modules require testing as new revisions of the software modules are introduced and as problems or "bugs" are discovered in existing software modules. An example of such a computer system is shown in FIG. 1. This example shows a small part of a telephone network 20. In this figure, a public telephone 22 is connected to a central office—service switching point (CO/SSP) 24. The CO/SSP 24, as part of its call processing, sends a call record over a signaling network 26 to a service control point (SCP) 28. The SCP 28 passes the call records on to a fraud detection system 30. When a new version of the fraud detection system 30 has been developed, it is necessary to test the new version of the fraud detection system 30 before adding it to the telephone network. This requires simulating the flow of call records that the new version of the fraud detection system has been designed to analyze. Ideally, this simulation data would be generated by the actual network elements in a laboratory setting. Often, this is not practical due to a number of reasons, including, limited funds, limited laboratory resources, staggered development cycles of dependent network elements, etc.

Test tools are often used to generate, transmit, receive and analyze test data when the actual network elements are not available. Test tools that perform these functions typically are built to emulate one highly specialized situation. These types of test tools are highly useful, but these tools can typically only emulate one narrow application. As networks evolve, data records and communication flow structures change and new data records and communication flow structures are added or existing structures modified. When this happens, conventions test tools need to be rewritten. Constant rewrites are time consuming and expensive.

Thus there exists a need for a network testing system and method that is not tied to particular test situation, is inexpensive and can easily be modified for different test situations.

SUMMARY OF THE INVENTION

A network testing system that overcomes these and other problems includes a message compiler accepting a plurality of data inputs to create a test message. A communicator is provided which is capable of transmitting the test message to a component under test. The test message is compliant with any of a plurality of protocols. The communicator is also capable of emulating a communication session using an emulation module.

Using the network testing system users can create test data and transmit the test data in a manner emulating the communication session that would be used in an operating environment. As data structures and communication session structures change, the network testing system can be easily, inexpensively and quickly updated to match the new structures.

The present invention is applicable to any industry that develops inter-related software modules, including: communication companies, business and operating software companies, networking companies, defense companies, semiconductor companies, etc. Programmers need to test how their programs will work with other programs before releasing their software. This requires creating test data, simulating how programs communicate with each other and analyzing the results. The present invention allows a programmer to perform all these tasks and is easily updated to accommodate changes in data formats and communication interfaces. This greatly simplifies the effort required by programmers to test their programs.

DETAILED DESCRIPTION OF THE DRAWINGS

The invention is used in testing software modules. Particularly software modules used in networks. In order to test a software module, the programmer has to create test data. Then the programmer has to create a module to simulate the communication interface between the software module under test and the other software modules in the network. Finally, the programmer must analyze the results. The invention is designed to provide a tool that can be easily tailored to perform all these tasks in an integrated manner.

Figure 1:
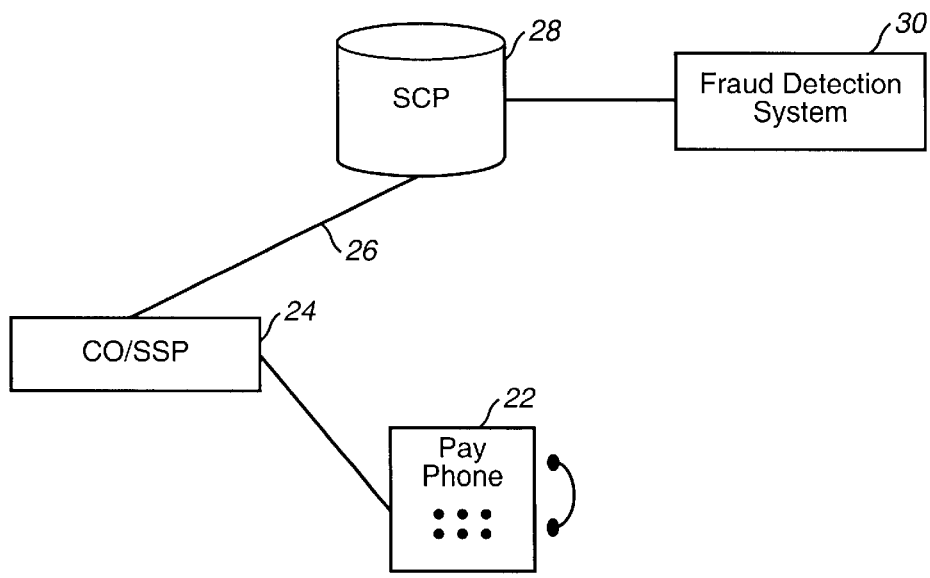
FIG. 1 is a block diagram of a portion of a telephone system.
Figure 2:
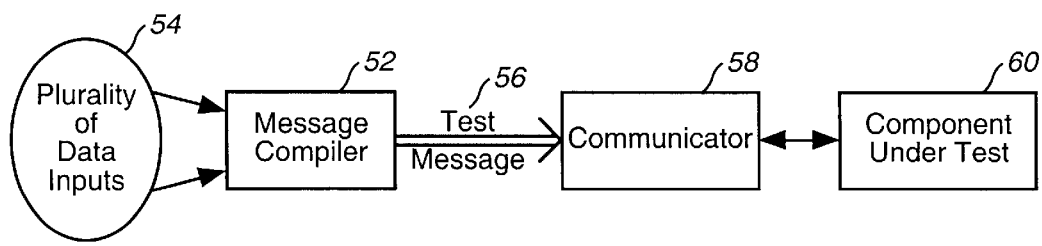
FIG. 2 is a block diagram of a network testing system in accordance with one embodiment of the invention.

FIG. 2 is a block diagram of a network testing system 50 in accordance with one embodiment of the invention. A message compiler 52 accepts a plurality of data inputs 54 to create a test message 56. A communicator 58 transmits the test message 56 to a component under test 60 in any of a plurality of protocols. The plurality of protocols include but are not limited to TCP/IP, system network architecture, RS 232 and RS422. The communicator 58 also emulates a communication session with the component under test 60 using an emulation module. The emulation model can emulate a number of communication models including a client server model, a publisher subscriber model and a peer to peer model. The communicator 58 may receive a response message from the component under test 60. In one embodiment a message disassembler is used to convert the test message or other message from a machine readable format to a human readable format. In another embodiment, the network testing system 50 includes a compare module that performs a logical comparison between an expected message and the response message. The compare module allows a user to quickly determine if the component under test is performing as expected. The logical comparison can be any of the logical functions: AND, OR, XOR and EQUAL.

In another embodiment, the communicator 58 is coupled to at least a second component under test. The communicator 58 is a multi-threaded application and may open at least a second thread for the second component under test. The communicator 58 may open more than one thread for each component under test.

In another embodiment the network testing system 50 includes a process manager that controls the message compiler, the communicator, the message disassembler and the compare module. This allows the components to be combined in a variety of ways depending on a user's testing needs. The system 50 can also include a preprocessor function. The preprocessor function can be used for any special stand alone functions. The preprocessor allows a user flexibility in designing their own specialized functions without compromising the usefulness and generic quality of the underlying system. The specialized functions include complex mathematical functions, calls to databases, logical operations, etc.

Figure 3:
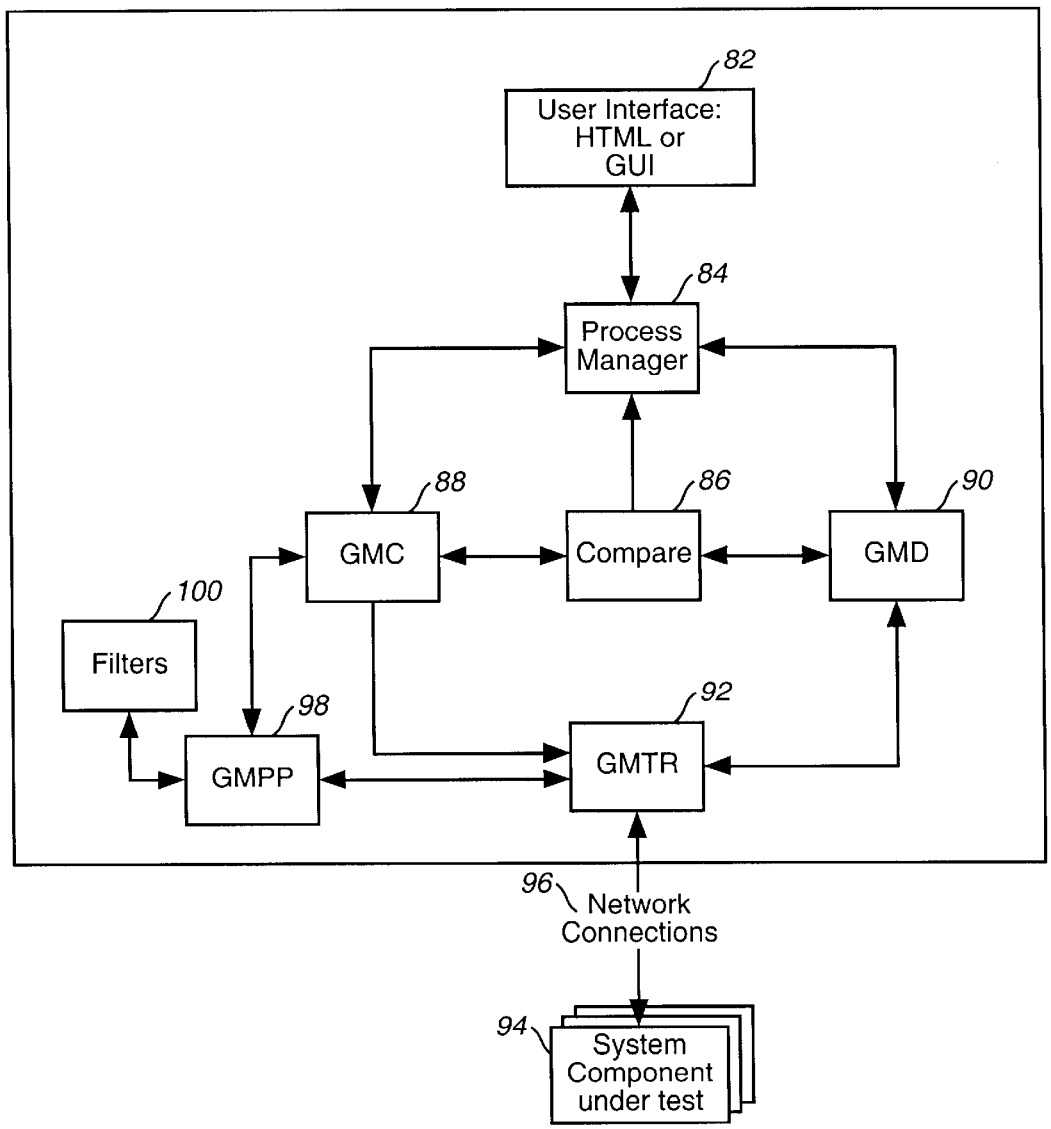
FIG. 3 is a block diagram of a network testing system in accordance with one embodiment of the invention.

FIG. 3 is a block diagram of a network testing system 80 in accordance with one embodiment of the invention. A user interface 82 is connected to a process manager 84 which controls the compare module 86, the message assembler (i.e., GMC generic message compiler) 88 and the message disassembler (i.e., GMD generic message disassembler) 90. The process manager 84 is capable of automating, scheduling and controlling all system components to satisfy the requirements of any test scenario. The data messages from the GMC 88 are sent to the communicator (i.e., GMTR generic message transmitter and receiver) 92. The GMTR 92 sends the data messages using the appropriate protocol to a system component under test 94 through a network connection 96. Response messages from the system component under test 94 are passed along to the GMD 90. The GMD 90 disassembles the response message converting it to a human readable format. Alternately the response message can be compared to an expected message using the compare module 86. User specific programs (filters) can be called by the GMC 88 and the GMTR 92 through the preprocessor (i.e., GMPP generic message preprocessor) 98. The GMPP 98 invokes the appropriate specialized function (e.g., filter) 100 and returns the appropriate response to the GMC 88 or GMTR 92.

Figure 4:
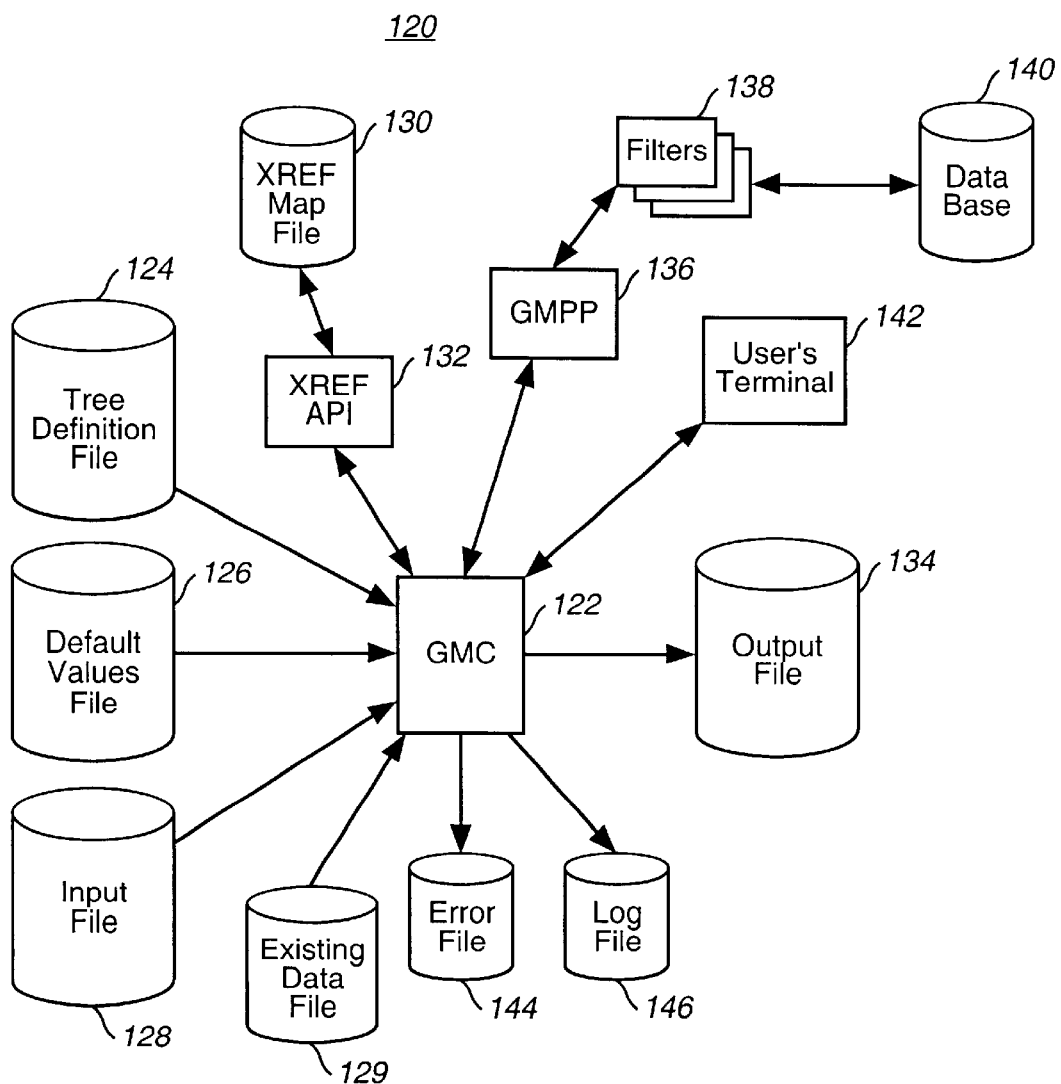
FIG. 4 is a block diagram of a message compiler system in accordance with one embodiment of the invention.

FIG. 4 is a block diagram of a message compiler system 120 in accordance with one embodiment of the invention. A Generic Message Compiler (GMC) or execution system 122 receives inputs from: a tree definition file (data structure file) 124, a default values file 126 and an input file (message input file) 128. In one embodiment, the input file 128 can specify data be incorporated from an existing data file 129. The GMC 122 processes the tree definition file 124 to build a blueprint of a record in a memory. In one embodiment, an XREF (reference) map file 130 points to the tree definition files 124. The GMC 122 communicates with the XREF map file 130 using an XREF API (application program interface) 132. Next the GMC 122 processes the default file 126. Then the GMC 122 processes the input file 128. The GMC 122 builds an image that is stored in an output file 134. The input file 128 may specify explicit values or specialized functions. Certain of the logical commands requiring mathematical functions are first processed by a Generic Message PreProcessor (GMPP) 136. The results from the GMPP 136 are then passed back to the GMC 122. The GMPP 136 in one embodiment, has calls to filters 138 for specialized processing. One of the filters 138 is a call to a database 140. In another embodiment, the GMPP 136 has an interface for access to databases. A user's interface 142 is used for creating and modifying the files 124, 126, 128 and starting the execution of the GMC 122. When the GMC 122 processes an input file 128, it produces an image or output file 134, an error file 144 and a log file (information file) 146. The error file lists any errors that occur in the processing of the input, default and tree definition file. The log file 146 logs the execution performance messages of the GMC 122. In one embodiment, the input file 128 is an ASCII file and the output file 134 is a binary file. In another embodiment the GMC 122 uses the UNIX lexical analyzer (LEX) and Yet Another Compiler Compiler (YACC) to process the files.

Figure 5:
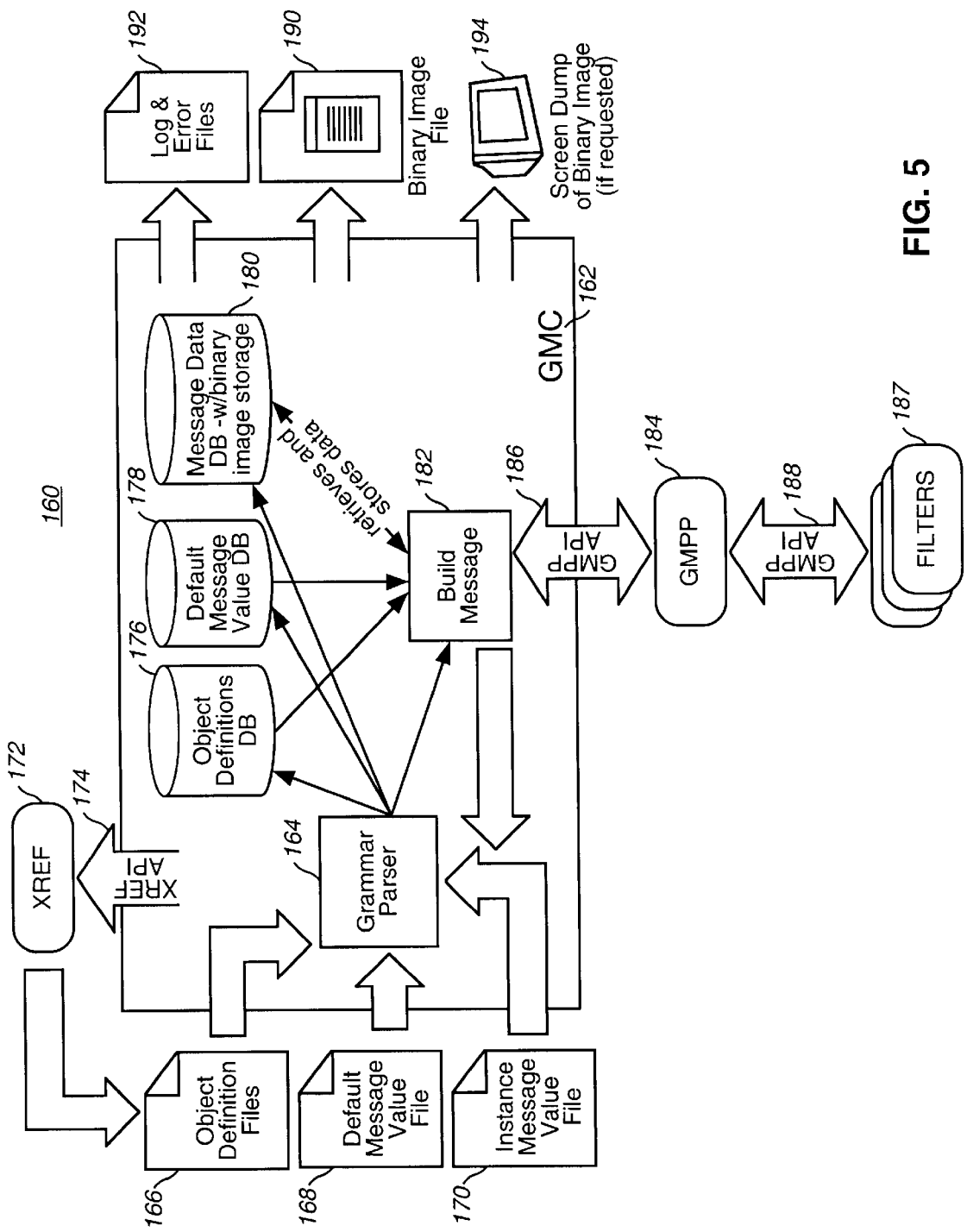
FIG. 5 is a block diagram of a message compiler system in accordance with one embodiment of the invention.

FIG. 5 is a block diagram of a message compiler system 160 in accordance with one embodiment of the invention. The GMC 162 includes a grammar parser 164 that receives inputs from the object definition files (tree definition file) 166, a default message value file (default values file) 168 and an instance message value file (input file) 170. When the grammar parser 164 starts executing it first uses the XREF (cross reference system, cataloging system) 172 to determine the location of the object definition file. The grammar parser 164 calls the XREF 172 through a XREF API (application program interface) 174. The XREF 172 returns the object definition file 166 to the grammar parser 164 which processes the object definition file to form the blueprint that is stored in the object definition database 176. Next, the default message value file 168 is executed by the grammar parser 164 and the processed file is stored in the default message value database 178. When the grammar parser 164 begins processing the instance message value file 170, it continually loads the message data into the message database 180 until the end of a message is recognized. It then invokes the routine build message 182. Upon completion of building the message, the parser continues processing the file until another end of message is recognized. This algorithm repeats until the end of the message value file is recognized. The build message routine 182 is connected to the GMPP 184 by a GMPP API 186. The GMPP 184 is connected to a plurality of filters 187 by a GMPP API 188. The output of processing the instance message value file includes a binary image file 190 and a log and error file 192. A user interface 194 is used for viewing the results or creating and modifying the various input files. Using the invention it is possible to define complex data records. The message value file can define complex logical operations to define a value for a component of a data record. In addition, the invention allows the test data to be generated efficiently for a variety of different software modules.

Figure 6:
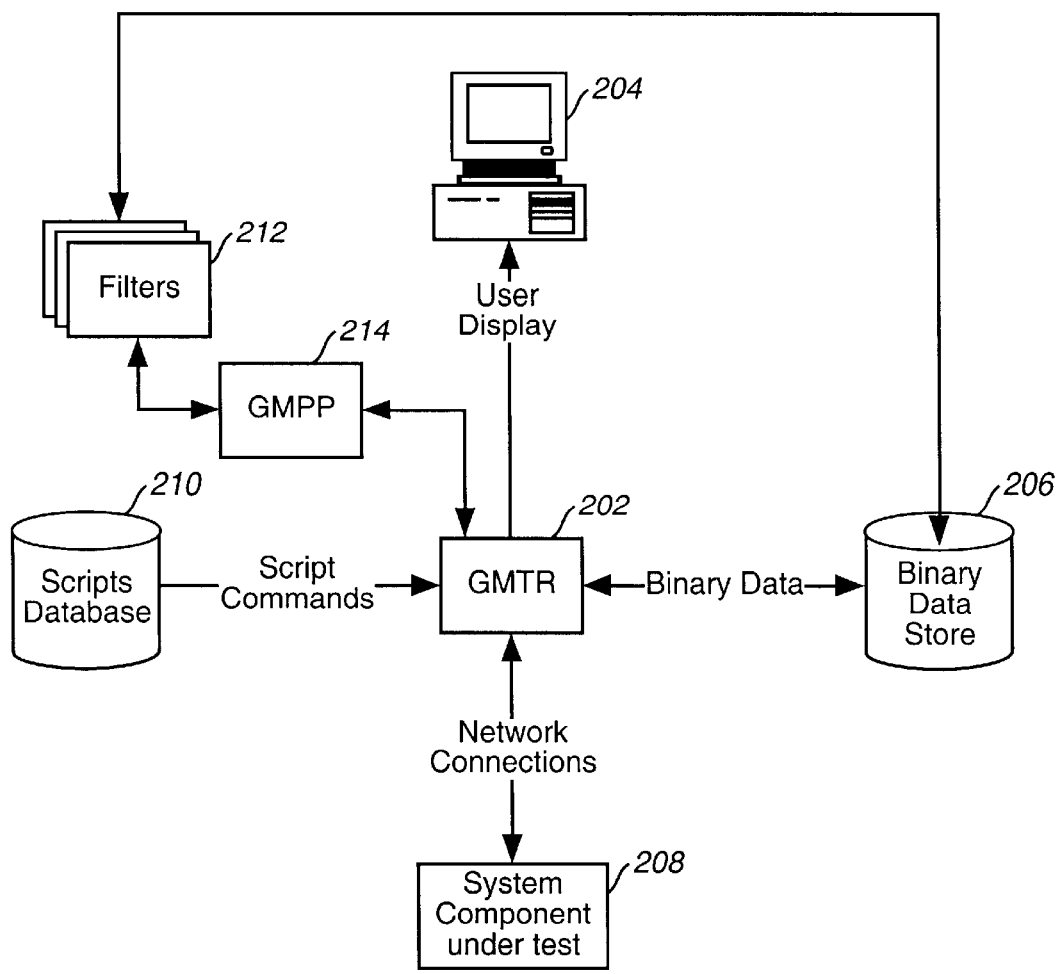
FIG. 6 is a block diagram of a communicator in accordance with one embodiment of the invention.

FIG. 6 is a block diagram of a communicator system 200 in accordance with one embodiment of the invention. The GMTR 202 is connected to a user display 204 and can run on any standard computer. The GMTR 202 receives data from a data source such as a data binary data store 206. The GMTR 202 transmits the binary data to a system component under test 208 in an appropriate protocol using a protocol translator. The GMTR 202 also needs to emulate the communication flow structure the component under test 208 is expecting. A scripts database 210 includes an emulation module that directs the GMTR 202 to emulate the communication flow structure the component under test 208 is expecting. Special or complex functions may be performed by a filter 212. The filter 212 is executed by the GMPP 214 which may call the GMTR 202.

Figure 7:
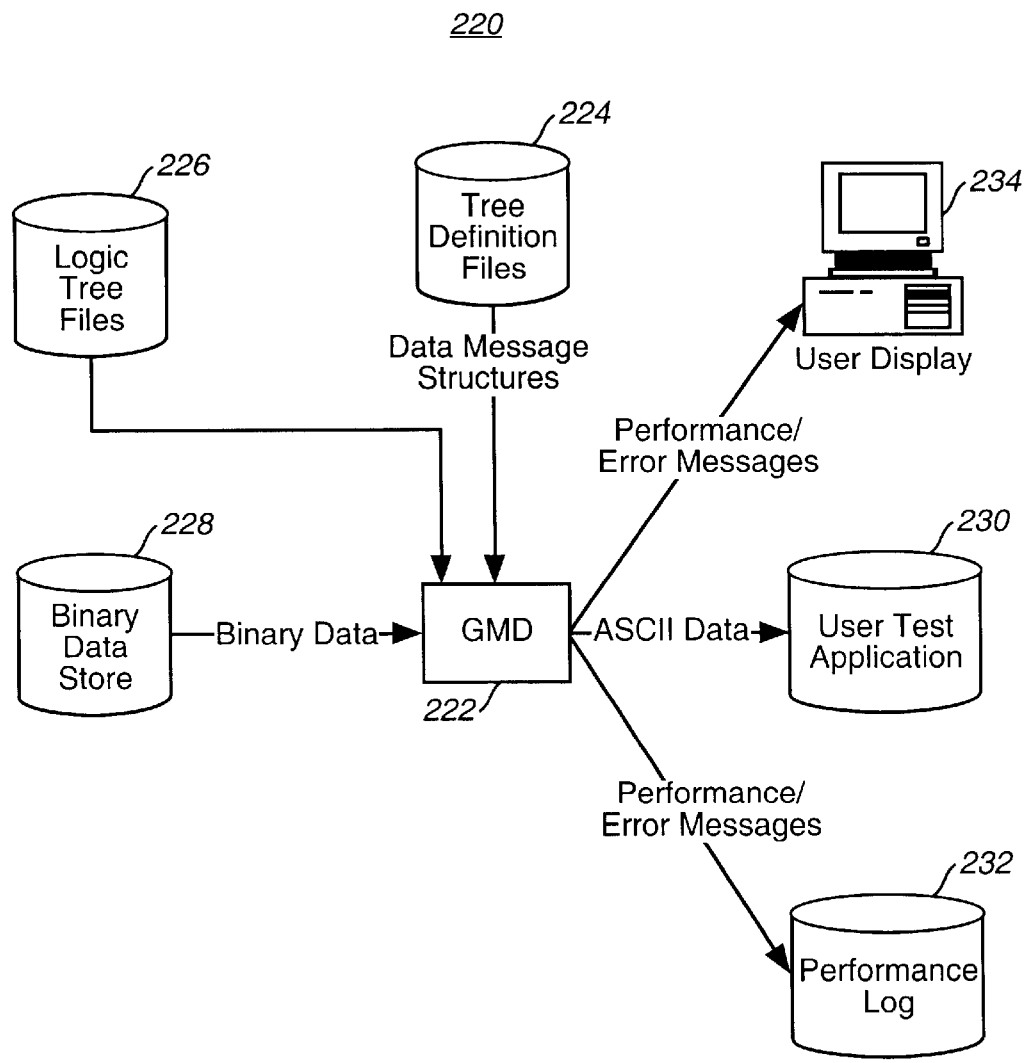
FIG. 7 is a block diagram of a message disassembler system in accordance with one embodiment of the invention.

FIG. 7 is a block diagram of a message disassembler system 220 in accordance with one embodiment of the invention. The GMD 222 uses a tree definition file 224 and associated logic tree file 226 to disassemble a binary file 228. The binary file 228 is converted from a machine readable format to a human readable format (e.g., ASCII). The human readable file is stored in the user test application store 230. Any performance messages and error messages that occur during the execution of the GMD 222 are stored in a performance log file 232 and optionally are displayed on a user display 234.

Figure 8:
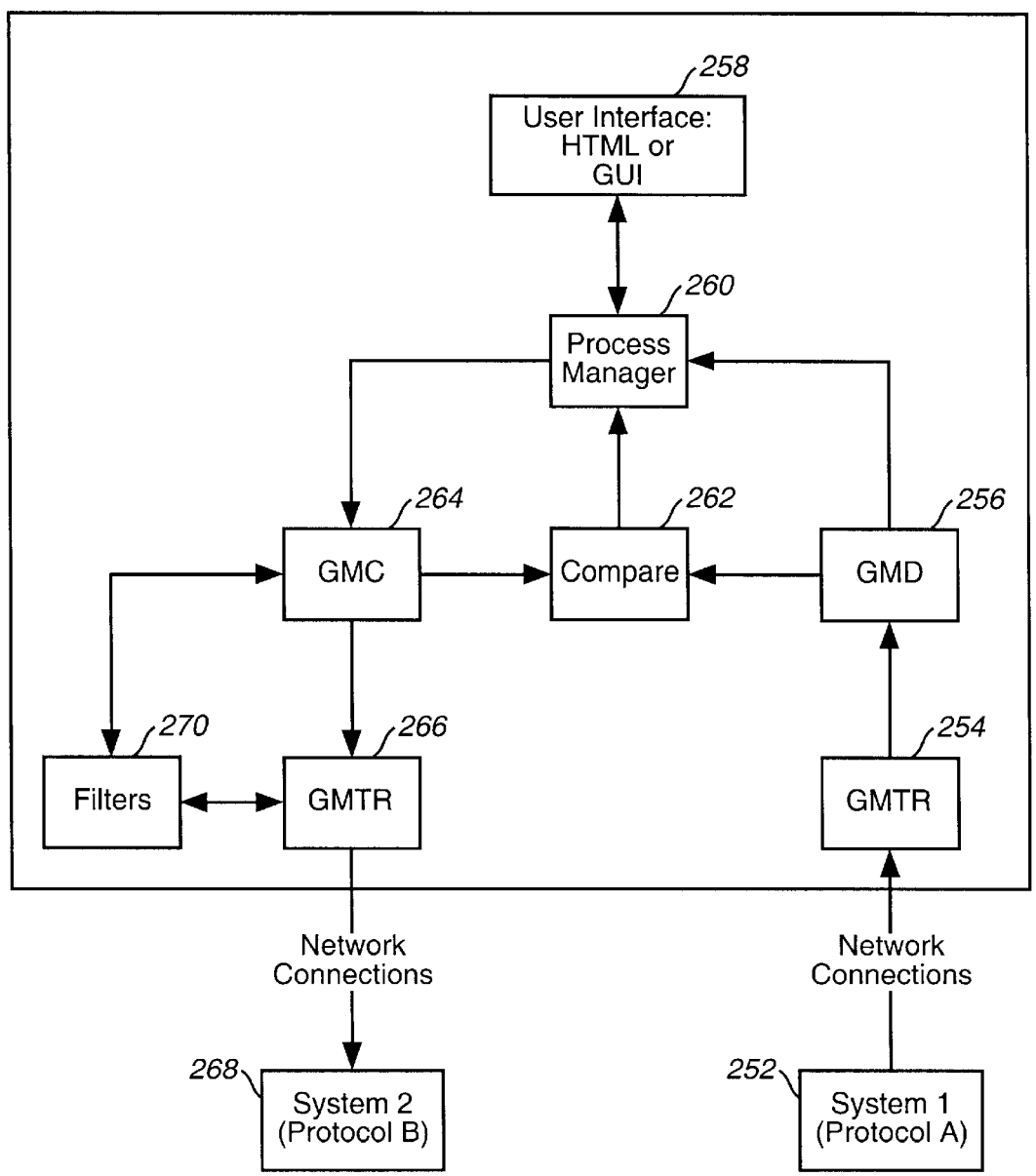
FIG. 8 is a block diagram of a network testing system setup to perform protocol translation and data analysis in accordance with one embodiment of the invention.

FIG. 8 is a block diagram of a network testing system 250 setup to perform protocol translation and data analysis in accordance with one embodiment of the invention. In this case a first system 252 communicates with a first instance of the GMTR 254 using a first protocol. Note that an instance as used herein includes a separate thread of execution. The GMTR 254 passes the messages (first machine readable messages) from the first system 252 to the GMD 256. The GMD 256 in one embodiment disassembles the messages and passes the human readable messages to user interface 258 as instructed by the process manager 260. In another embodiment the machine readable messages are compared to expected messages using the compare module 262. After the messages have been disassembled, a user can easily alter the messages. The GMC 264 compiles the human readable messages into a second machine readable file that is compliant with a second protocol. A second instance of the GMTR 266 then transmits the second machine readable file to a second component under test 268 using a second protocol. When a user specific function is required by the GMC 264 or the GMTR 266, a filter 270 written by the user can be called by these functions. Note filters 270 are processed by the GMPP and only the results are passed to the GMC 264 or the GMTR 266.

Figure 9:
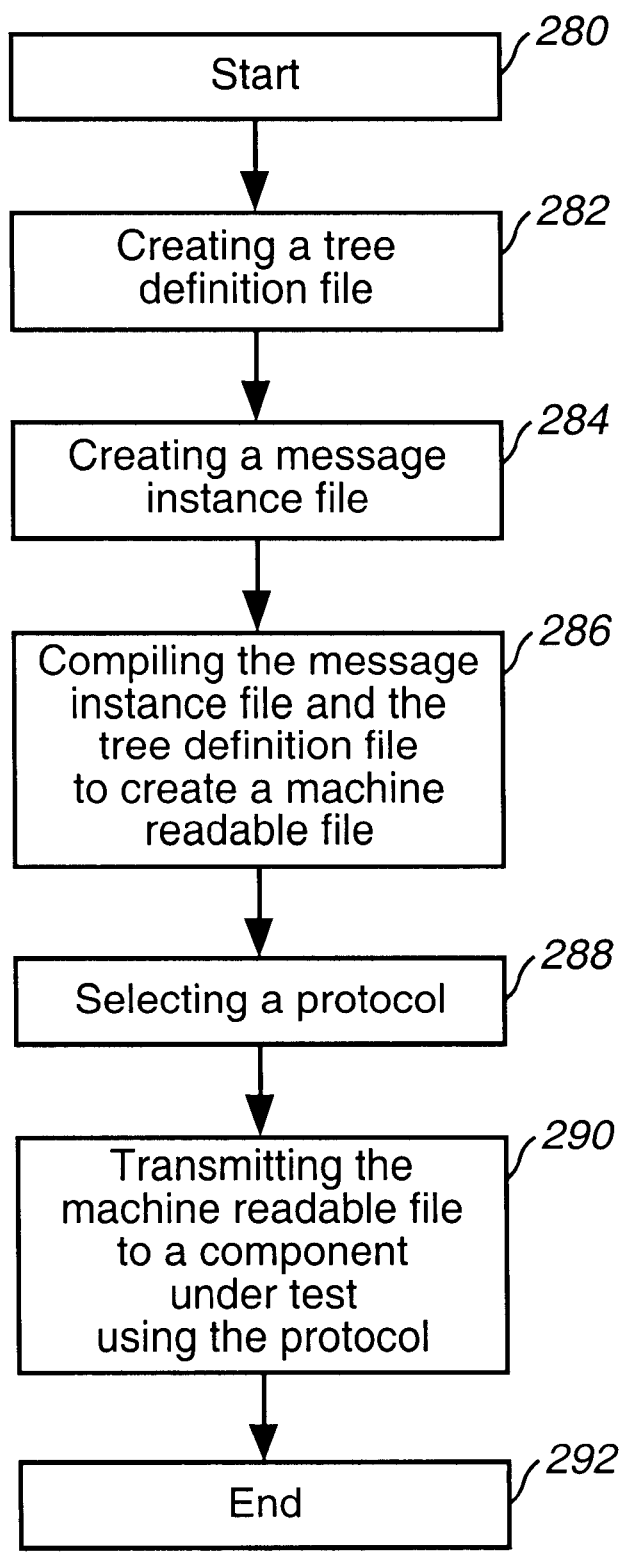
FIG. 9 is a flow chart of the steps used in operating a network testing system in accordance with one embodiment of the invention.

FIG. 9 is a flow chart of the steps used in operating a network testing system in accordance with one embodiment of the invention. The process starts, step 280, by creating a tree definition file at step 282. A message instance file is created at step 284. The message instance file and the tree definition file are compiled to create a machine readable file at step 286. A protocol for transmitting the file is selected at step 288. At step 290, the machine readable file is transmitted to the component under test using the protocol which ends the process at step 292.

Figure 10:
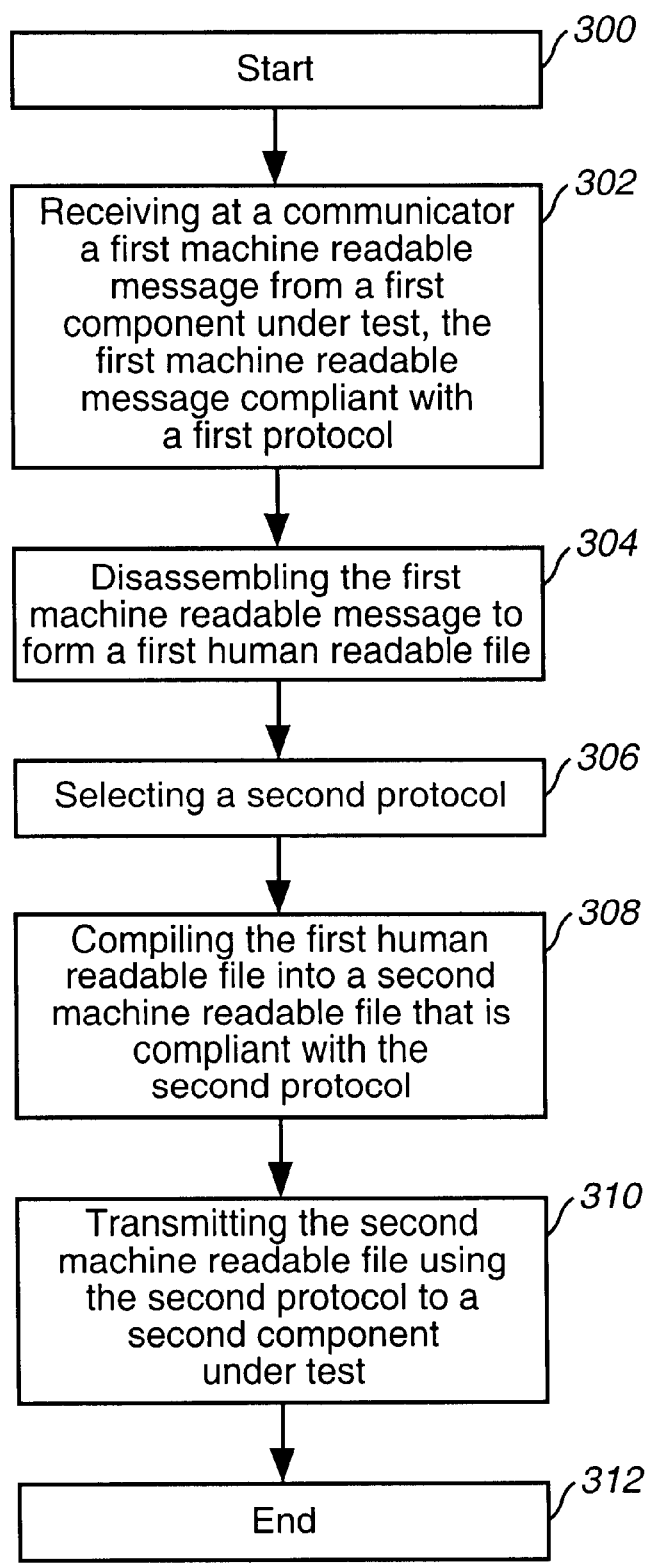
FIG. 10 is a flow chart of the steps used in a protocol conversion in accordance with one embodiment of the invention.

FIG. 10 is a flow chart of the steps used in a protocol conversion in accordance with one embodiment of the invention. The process starts, step 300, by receiving at a communicator a first machine readable message from, a first component under test. The first machine readable message is compliant with a first protocol. The first machine readable message is disassembled to form a first human readable file at step 304. A second protocol is selected at step 306. The first human readable file is compiled into a second machine readable file that is compliant with the second protocol at step 308. At step 310 the second machine readable file is transmitted, using the second protocol, to a component under test which ends the process at step 312.

Figure 11:
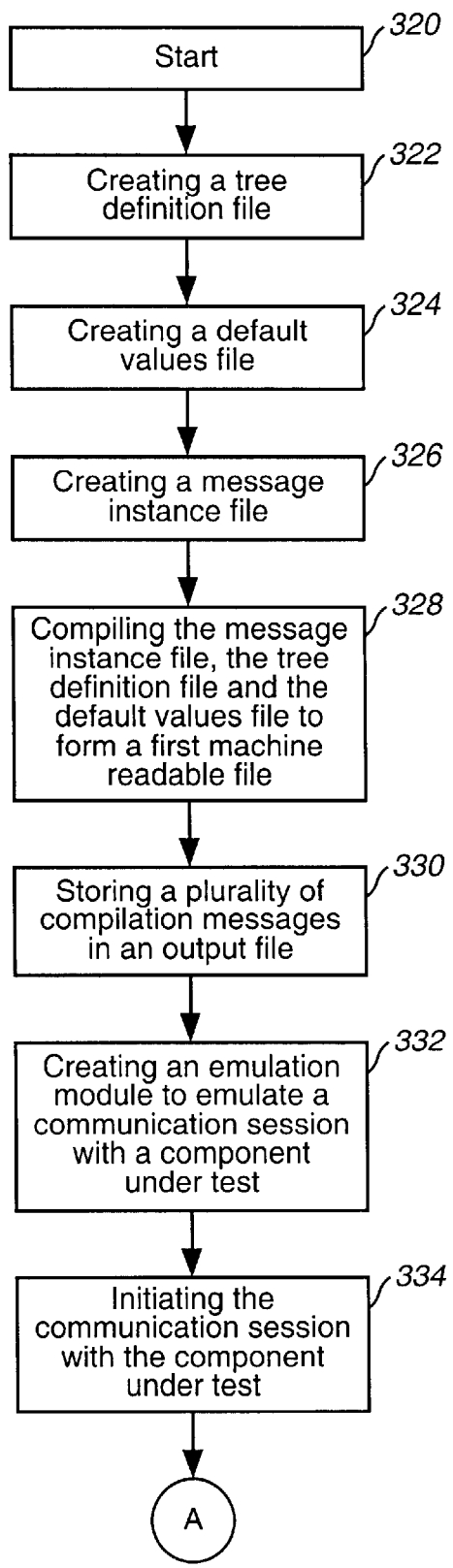
FIGS. 11 & 12 comprise a flow chart of the steps used in operating a network testing system in accordance with one embodiment of the invention.
Figure 12:
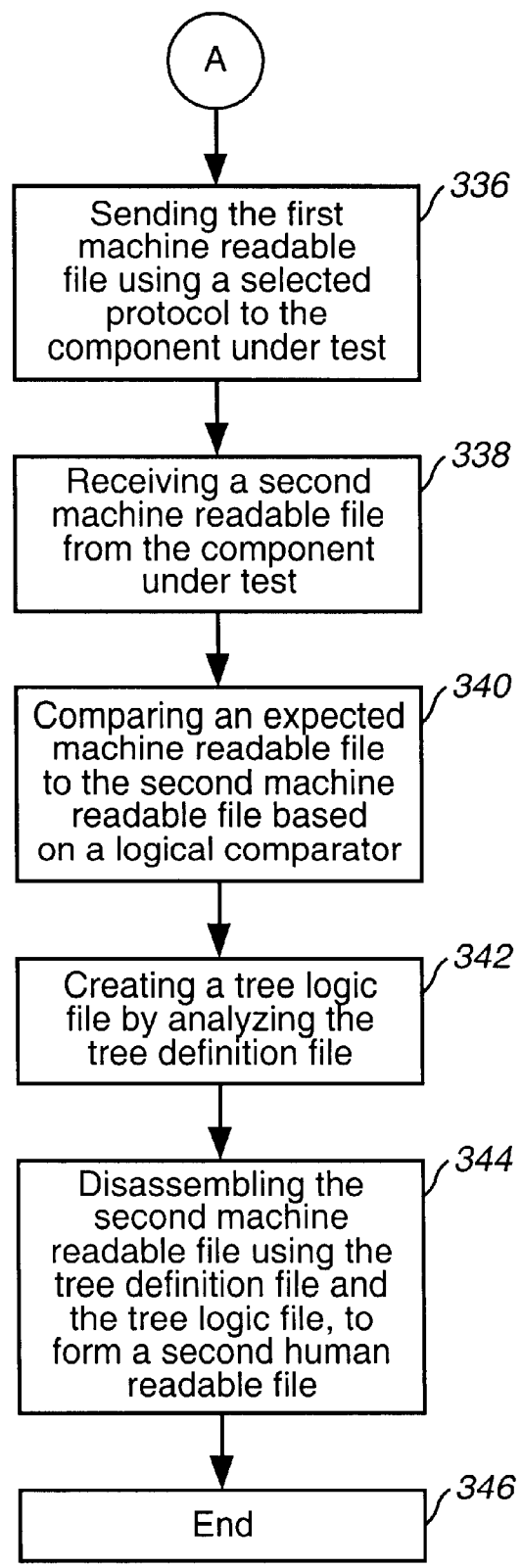

FIGS. 11 & 12 comprise a flow chart of the steps used in operating a network testing system in accordance with one embodiment of the invention. The process starts, step 320, by creating a tree definition file at step 322. A default values file is created at step 324. A message instance file is created at step 326. The message instance file, tree definition file and default values file are compiled to form a first machine readable file at step 328. A plurality of compilation messages is stored in an output file at step 330. An emulation module (communication emulation module) to emulate a communication session with a component under test is created at step 332. The communication session with the component under test is initiated at step 334. The first machine readable file is sent to the component under test using a selected protocol at step 336. A second machine readable file is received from the component under test at step 338. An expected machine readable file is compared to the second machine readable file using a logical comparator at step 340. A tree logic file is created by analyzing the tree definition file at step 342. At step 344, the second machine readable file is disassembled using the tree definition file and the tree logic file. This forms a second human readable file which ends the process at step 346.

Using the invention a user can quickly, efficiently and inexpensively test any network component. The system provides the user with all the tools they need to create a test scenario and to analyze the results. The system provides: a system for creating test data; a system for communication with the component under test and transmitting receiving test data; a system for disassembling received test data into human readable form; a system for comparing received results with expected results; and a process manager capable of automating, scheduling and controlling all these system components to satisfy the requirements of any test scenario.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A network testing system comprising:
    a message compiler accepting a plurality of data inputs to create a test message; and
    a communicator capable of transmitting the test message to a component under test compliant with any of a plurality of protocols and capable of emulating a communication session based on an emulation module.

2. The system of claim 1, further including:
    a message disassembler capable of converting the test message from a machine readable format to a human readable format.

3. The system of claim 2, wherein the communicator receives a response message from the component under test.

4. The system of claim 3, further including a compare module that performs a logical comparison between an expected message and the response message.

5. The system of claim 4, wherein the logical comparison is selected from the group of logical functions of: AND, OR, XOR and EQUAL.

6. The system of claim 4, wherein the communicator is coupled to at least a second component under test and opens at least a second thread for the second component under test.

7. The system of claim 4, further including a process manager, the process manager controlling the message compiler, the communicator, the message disassembler and the compare module.

8. The system of claim 7, further including a preprocessor function callable by the message compiler to perform a mathematical function.

9. The system of claim 8, wherein the plurality of data inputs to the message compiler comprise, a data definition file and a message instance file.

10. The system of claim 9, further including an index that catalogs a location of the data definition file.

11. The system of claim 9, further including a default values file as part of the plurality of data inputs.

12. The system of claim 1, wherein the plurality of protocols the communicator can use is selected from the group including: TCP/IP, security routing services, RS 232, and RS 422.

13. The system of claim 1, wherein the emulation module is capable of emulating a client server model.

14. The system of claim 1, wherein the emulation module is capable of emulating a peer to peer model.

15. The system of claim 1, wherein the emulation module is capable of emulating a publisher subscriber model.

16. The system of claim 8, wherein the message disassembler uses a data definition file and a tree logic file to convert a file from the machine readable format to the human readable format.

17. The system of claim 8, further including a user interface coupled to the process manager.

18. A system for protocol translation and analysis comprising:
a first component under test transmitting a message with a first format;
a communicator having a first instance receiving the message using the first protocol;
a message disassembler converting the message to a second format to form an intermediate message;
a message compiler converting the intermediate message to a third format to form a second message;
a second instance of the communicator transmitting the second message using a second protocol; and
a second component under test receiving the second message using the third protocol.

19. The system of claim 18, wherein the message disassembler includes a first tree definition file used in converting the message to the second format.

20. The system of claim 18, wherein a user is capable of altering the intermediate message.

21. The system of claim 19, wherein the message compiler includes a second tree definition file used in converting the intermediate message to the third format.

22. A method of testing a network component, comprising the steps of:
(a) creating a tree definition file;
(b) creating a message instance file;
(c) compiling the message instance file and the tree definition file to create a machine readable file;
(d) selecting a protocol; and
(e) transmitting the machine readable file to a component under test compliant with the protocol.

23. The method of claim 22, further including the steps of:
(f) receiving a second machine readable file from the component under test;
(g) comparing the second machine readable file to an expected readable file.

24. The method of claim 22, further including the steps of:
(f) receiving a second machine readable file from the component under test;
(g) disassembling the second machine readable file to form a first human readable file.

25. The method of claim 24, wherein step (g) further includes the steps of:
(g1) selecting the tree definition file;
(g2) forming a tree logic file.

26. The method of claim 22, wherein step (e) further includes the step of:
(e1) creating a communication emulation module.

27. The method of claim 22, wherein step (c) further includes the step of:
(c1) storing an error message in an error file;
(c2) storing a processing message in a log file.

28. A method of protocol conversion comprising the steps of:
(a) receiving at a communicator a first machine readable message from a first component under test, the first machine readable message compliant with a first protocol;
(b) disassembling the first machine readable message to form a first human readable file;
(c) compiling the first human readable file into a second machine readable file that is compliant with the second protocol; and
(d) transmitting the second machine readable file using the second protocol to a second component under test.

29. The method of claim 28, further including the steps of:
(e) receiving at a second instance of the communicator a third machine readable file from the second component under test;
(f) disassembling the third machine readable message to form a second human readable file;
(g) compiling the second human readable file into a fourth machine readable file that is compliant with the first protocol; and
(h) transmitting the fourth machine readable file using the first protocol to the first component under test.

30. The method of claim 28, wherein step (b) further includes the steps of:
(b1) selecting a tree definition file;
(b2) creating a tree logic file.

31. A network testing system comprising:
a message compiler accepting input from a tree definition file, and a message instance file to create a machine readable test message;
a communicator transmitting the machine readable test message in one of a plurality of communication protocols to a component under test, the communicator emulating a communication session with the component under test using an emulation module, the communicator receiving a second machine readable message from the component under test;
a message disassembler converting the second machine readable message into a second human readable file using the tree definition file and a tree logic file; and
a user interface capable of displaying the second human readable file.

32. The system of claim 31, further including a compare module that performs a logical comparison between the second machine readable message and an expected machine readable test message.

33. The system of claim 32, further including a process manager connecting the user interface to the message compiler, the communicator, the message disassembler and the compare module.

34. The system of claim 33, further including a preprocessor callable from the message compiler, the communicator, the message disassembler and the compare module, the preprocessor performing a specialized mathematical function.

35. The system of claim 31, wherein the communicator is a multi-threaded application.

36. A method of testing a network component, comprising the steps of:

(a) creating a tree definition file;

(b) creating a default values file;

(c) creating a message instance file;

(d) compiling the message instance file, the tree definition file and the default values file to form a first machine readable file;

(e) storing a plurality of compilation messages in an output file;

(f) creating an emulation module to emulate a communication session with a component under test;

(g) initiating the communication session with the component under test;

(h) sending the first machine readable file using a selected protocol to the component under test;

(i) receiving a second machine readable file from the component under test;

(j) comparing an expected machine readable file to the second machine readable file based on a logical comparator;

(k) creating a tree logic file by analyzing the tree definition file; and (l) disassembling the second machine readable file using the tree definition file and the tree logic file, to form a second human readable file.

\* \* \* \* \*

UNITED STATES PATENT AND TRADEMARK OFFICE
CERTIFICATE OF CORRECTION

PATENT NO. : 6,321,347 B1
DATED : November 20, 2001
INVENTOR(S) : Beeker et al.

It is certified that error appears in the above-identified patent and that said Letters Patent is hereby corrected as shown below:

<u>Column 1,</u>
Line 6, "xxx (COS-96-033, COS-96-034, & COS-96-035)" should read -- 09/110,547 filed July 6, 1998; 09/143,956 filed August 31, 1998; and 09/143,957 filed August 31, 1998 -- therefor.

Signed and Sealed this

Twentieth Day of August, 2002

Attest:

Attesting Officer

JAMES E. ROGAN
*Director of the United States Patent and Trademark Office*